May 29, 1923.  1,457,132
G. C. ABBE
COUPLING FOR EQUALIZING APPARATUS FOR LOCOMOTIVES
Filed March 18, 1921  3 Sheets-Sheet 1
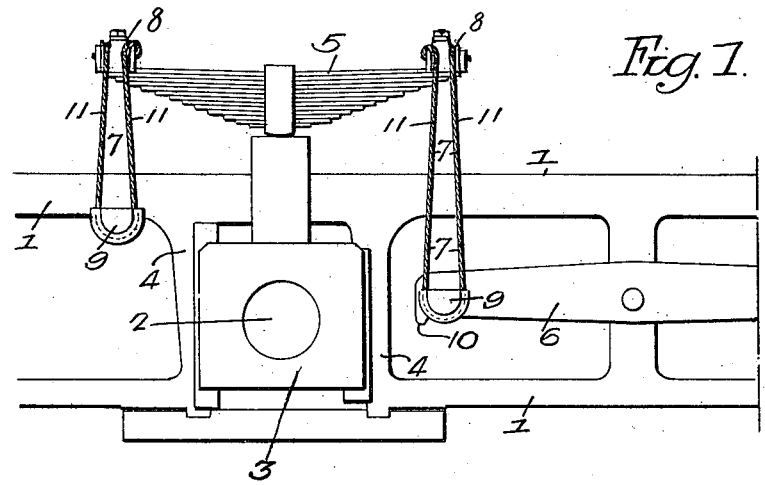
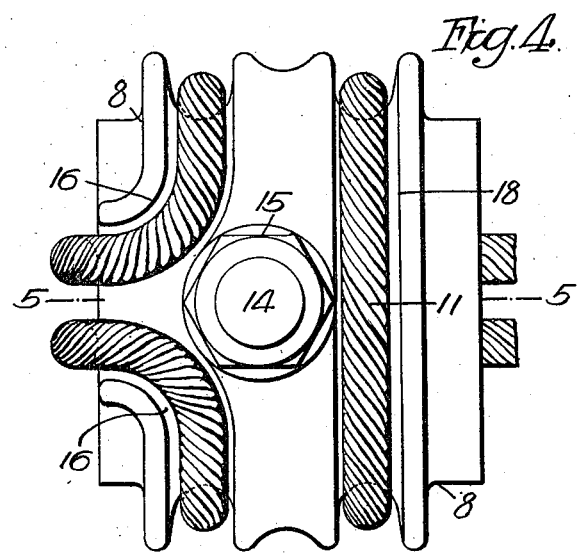
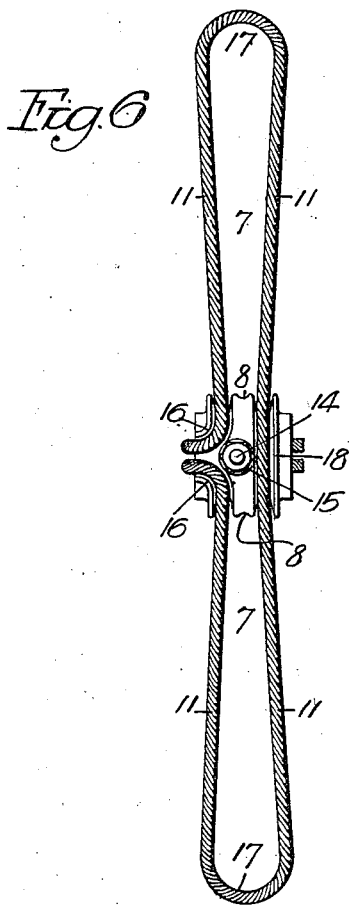
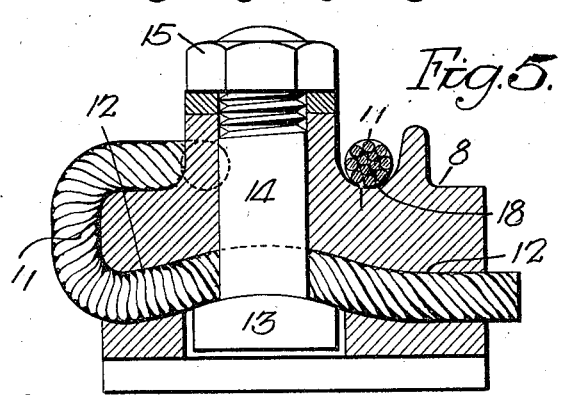
Inventor— George C. Abbe.
by his Attorneys—Howson & Howson

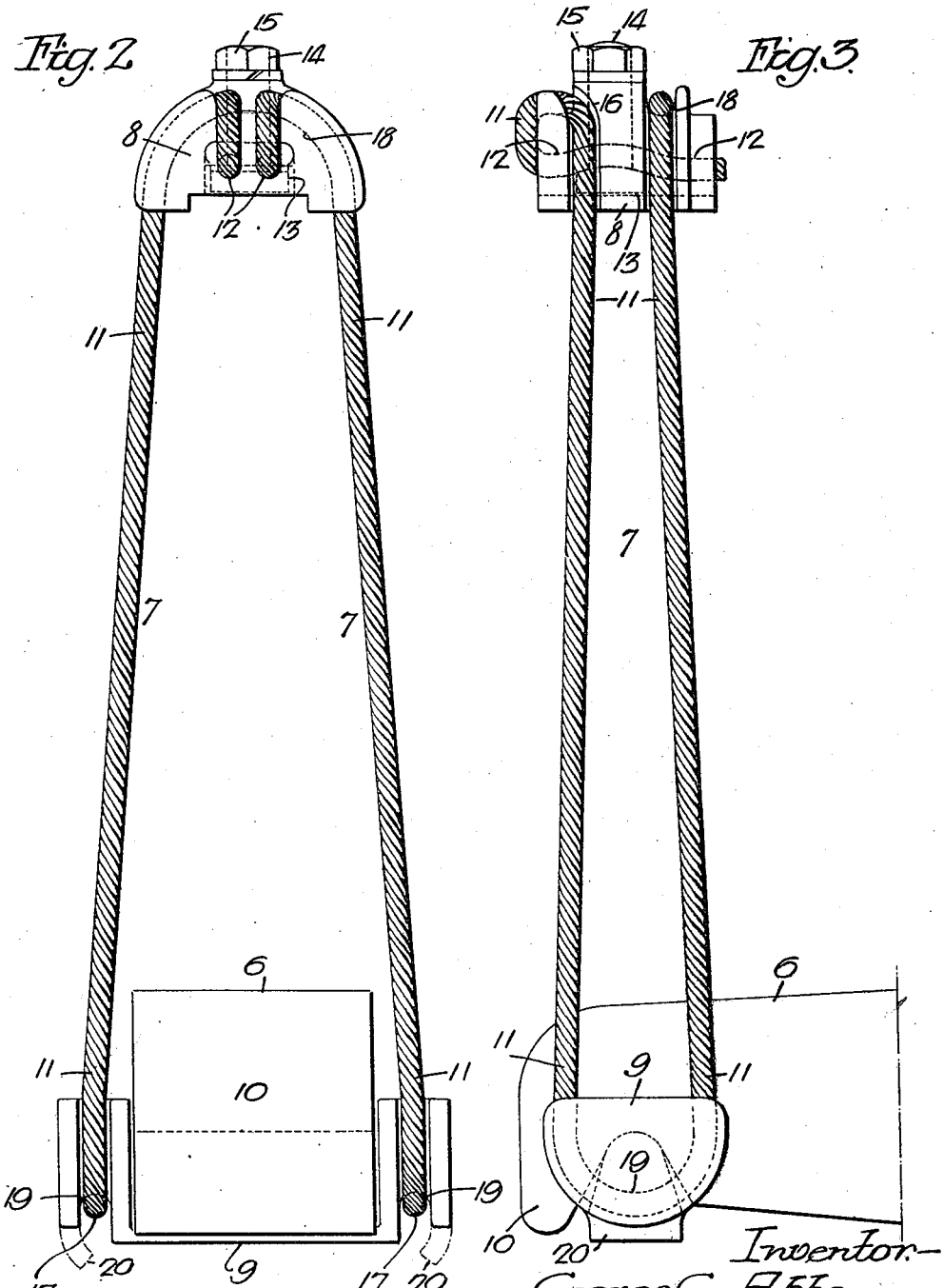

May 29, 1923.
G. C. ABBE
1,457,132
COUPLING FOR EQUALIZING APPARATUS FOR LOCOMOTIVES
Filed March 18, 1921  3 Sheets-Sheet 3
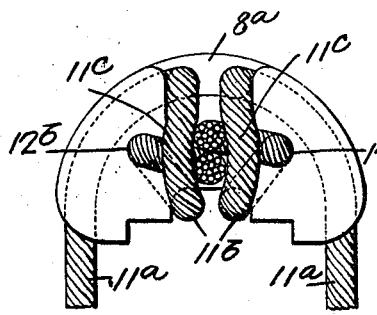
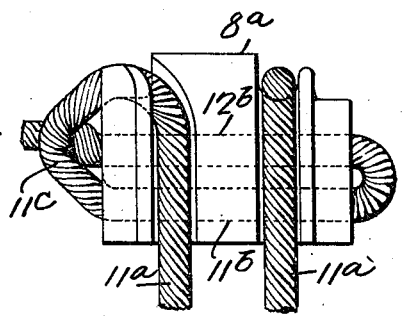
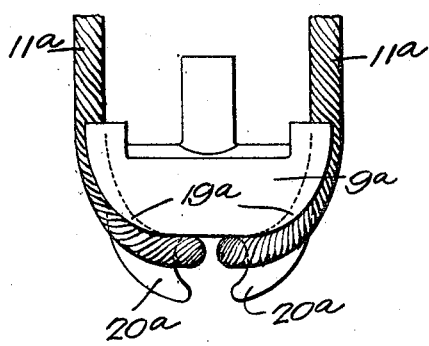
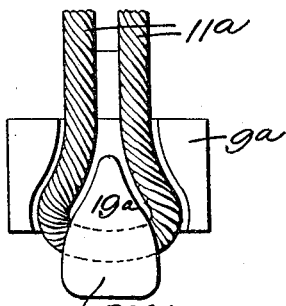
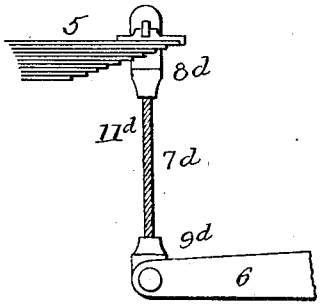
Inventor.-
George C. Abbe.
by his Attorneys
Howson & Howson Patented May 29, 1923.

1,457,132

UNITED STATES PATENT OFFICE.

GEORGE C. ABBE, OF LANSDOWNE, PENNSYLVANIA, ASSIGNOR TO THE BALDWIN LOCOMOTIVE WORKS, OF PHILADELPHIA, PENNSYLVANIA, A CORPORATION OF PENNSYLVANIA.

COUPLING FOR EQUALIZING APPARATUS FOR LOCOMOTIVES.

Application filed March 18, 1921. Serial No. 453,251.

*To all whom it may concern:*

Be it known that I, GEORGE C. ABBE, a citizen of the United States, residing in Lansdowne, county of Delaware, Pennsylvania, have invented certain Improvements in Couplings for Equalizing Apparatus for Locomotives, of which the following is a specification.

My invention relates to certain improvements in the equalizing mechanism of locomotives, in which the equalizing springs are connected to equalizing levers, or to the frame of the locomotive, by links. These links are usually made of heavy wrought metal. The links must be flexibly connected to the levers and springs to accommodate the movements of the locomotive and they are comparatively heavy and costly.

The main object of my invention is to reduce the weight and the cost of the links by substituting therefor a flexible member consisting essentially of a wire cable, which will carry the load and yet will have sufficient flexibility in itself so that the ends may be readily connected to the springs and levers.

My invention also relates to certain improvements in the method of fastening the cable to the blocks, which are attached to the springs and levers.

In the accompanying drawings:

Fig. 1 is a side view of sufficient of a locomotive frame to illustrate my invention applied to a section of the equalizing mechanism of a locomotive;

Fig. 2 is an enlarged view of one of the connections shown in Fig. 1;

Fig. 3 is a side view;

Fig. 4 is a plan view of the upper block;

Fig. 5 is a sectional view of the upper block on the line 5—5, Fig. 4;

Fig. 6 is a view showing the upper block illustrated in Fig. 1 with the two loops of the wire cable spread out prior to being coupled to the end of a lever;

Figs. 7 and 8 are views illustrating a modification of the upper block and showing a different means of fastening the wire cable to the upper block;

Figs. 9 and 10 are views illustrating a modification of the lower block; and

Fig. 11 is a view illustrating a modification showing a single cable.

Referring to Fig. 1, 1 is the frame of a locomotive. 2 is the axle. 3 is the axle box. 4 are the pedestals. 5 is a spring supported by the axle box. 6 is an equalizing lever, in the present instance, which is pivoted to the frame 1. 7—7 are flexible members in the form of wire cables 11, which take the place of the usual links and couple the springs 5 to the lever 6 and to the frame of the locomotive, in the present instance. 8 is an upper block, which is mounted on the spring 5.

9 is a lower block, which is engaged by the hook 10 of the lever 6, or may form an integral part of the lever. In the present instance, attached to the upper block 8 is a wire cable 11. The ends of this cable are passed through an opening 12 in the upper block and are clamped by a head 13 of a bolt 14, which has a nut 15. The opening 12 in the upper block is slightly curved, as is also the bearing face of the head 13 of the bolt, as clearly shown in Fig. 5, so as to positively grip the ends of the cable. The cable is then passed through curved grooves 16 in the upper block and two loops 17 are formed, the other portion of the cable forming the loops resting in the groove 18 of the upper block, as shown clearly in Fig. 6. The two loops 17 engage the slotted, curved projections 19 of the lower block 9, as clearly shown in Figs. 2 and 3.

By this construction, the two ends of the cable are firmly held together and to the upper block, while the two loops are coupled, as above described, to the lower block, which is engaged by one of the equalizing levers, or is attached to the frame.

By using the cable, as shown, the connection is flexible without the use of any flexible couplings, or other devices, such as are used in equalizing mechanisms having wrought iron links. While I have shown a particular arrangement for holding the ends of the cables, as illustrated in Figs. 4 and 5, the mechanism may be modified, if found desirable.

Figs. 7 and 8 illustrate one modification. In this case, the ends of the wire cables 11$^a$ pass through curved slots in the upper surface of the block 8$^a$, then down and under the block, as at 11$^b$, then around and through an opening 12$^b$ in the block, and the ends are passed under the portion 11$^c$ of the cable and project through the space between the two portions 11$^c$, as clearly shown in Fig. 7. By this arrangement a clamping bolt is unnecessary, although it may be used, if desired.

In some instances, the outer flange of the slotted projections 19 of the lower block may be curved, as illustrated by dotted lines 20, Fig. 2, in order to prevent the loops becoming accidentally detached from the block.

In Figs. 9 and 10, I have illustrated a modification of the lower block, in which the projections 19$^a$ are curved inwardly and below the block and are provided with extended hooks 20$^a$ so that, when the loops are coupled to the block 9$^a$, the lower portions of the loops are bent to conform to the shape of the block.

In Fig. 11, I have illustrated a single cable connection 7$^d$, the cable 11$^d$ being coupled to two heads 8$^d$ and 9$^d$, which are, in turn, coupled to the spring and lever.

Other modifications of the arrangement of the wire cable will readily suggest themselves.

I claim:

1. The combination of a locomotive frame; an equalizing lever pivoted to the frame; an axle box; a spring mounted on the axle box; and a flexible member connecting the spring to the lever and frame.

2. The combination in equalizing mechanism for a locomotive, or car, of upper and lower members of the equalizing mechanism; and a flexible coupling having upper and lower blocks connected to the upper and lower members of the equalizing mechanism.

3. The combination of a flexible connection for the equalizing mechanism of a locomotive, or car, consisting of two blocks; and a wire cable attached to one of said blocks and formed into two loops, which engage the other block.

4. The combination of a connecting member for the equalizing mechanism of a locomotive, or car, consisting of upper and lower blocks; a cable; and means for attaching the ends of the cable to one of said blocks, the cable being bent around the block to which it is fastened so as to form two loops, the other blocks having two hooks for engaging the loops of the cable.

5. The combination of a connecting member for the equalizing mechanism of a locomotive, or car, consisting of two blocks; a flexible cable connecting the blocks, one of said blocks having two curved grooves spaced apart for the reception of the cable; transverse slots through which the ends of the cable extend, the slots being curved; and a clamping bolt having a head engaging the cable within the slots, the other block having two hooked extensions projecting into the loops formed by the cable.

6. The combination in equalizing mechanism for a locomotive, or car, of upper and lower members; a connecting member consisting of a wire cable having upper and lower blocks, the cable being formed into two loops and attached to the upper block; and hooked members on the lower block engaging the loops, the hooked members being curved at the lower ends so as to prevent the accidental detachment of the loops from the block.

GEORGE C. ABBE.